(12) United States Patent
Chihara

(10) Patent No.: US 8,801,193 B2
(45) Date of Patent: Aug. 12, 2014

(54) IMAGE DISPLAY DEVICE AND LASER LIGHT SOURCE DEVICE INCLUDING MULTIPLE LASER ELEMENTS WHOSE LIGHT AMOUNTS ARE INDIVIDUALLY MEASURED

(75) Inventor: Hitoshi Chihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 506 days.

(21) Appl. No.: 13/069,449

(22) Filed: Mar. 23, 2011

(65) Prior Publication Data

US 2011/0255564 A1 Oct. 20, 2011

(30) Foreign Application Priority Data

Apr. 19, 2010 (JP) ................................ 2010-096461

(51) Int. Cl.
*G03B 21/20* (2006.01)
(52) U.S. Cl.
USPC ...................... 353/85; 372/29.011; 372/38.01
(58) Field of Classification Search
CPC ............................ H04N 9/3135; H04N 9/3161
USPC ................. 353/85; 372/9, 25, 29.01, 29.011, 372/29.014, 29.021, 38.01, 38.02, 38.07, 372/50.12, 50.121
See application file for complete search history.

(56) References Cited

U.S. PATENT DOCUMENTS

| | | | |
|---|---|---|---|
| 8,235,534 B2 | 8/2012 | Nakayama et al. | |
| 2002/0159039 A1* | 10/2002 | Yoneno | 353/85 |
| 2006/0023304 A1* | 2/2006 | Monch et al. | 359/443 |
| 2006/0170883 A1* | 8/2006 | Matsui | 353/85 |
| 2006/0279710 A1* | 12/2006 | Tani | 353/85 |
| 2009/0059070 A1* | 3/2009 | Matsui | 348/500 |
| 2009/0190103 A1* | 7/2009 | Takahashi et al. | 353/98 |
| 2010/0201894 A1 | 8/2010 | Nakayama et al. | |
| 2010/0277697 A1* | 11/2010 | Duncan et al. | 353/31 |
| 2010/0302513 A1* | 12/2010 | Takahashi et al. | 353/33 |
| 2010/0302515 A1* | 12/2010 | Plut | 353/85 |
| 2010/0328611 A1* | 12/2010 | Silverstein et al. | 353/7 |
| 2011/0304832 A1* | 12/2011 | Hashizume | 353/85 |

FOREIGN PATENT DOCUMENTS

| | | |
|---|---|---|
| JP | 2004-163527 | 6/2004 |
| JP | 2004-342278 A | 12/2004 |
| JP | 2010-085472 | 4/2010 |
| WO | WO 2009/142015 A1 | 11/2009 |

* cited by examiner

*Primary Examiner* — Georgia Epps
*Assistant Examiner* — Bao-Luan Le
(74) *Attorney, Agent, or Firm* — Birch, Stewart, Kolasch & Birch, LLP

(57) ABSTRACT

An image display device including a laser light source device that includes: laser elements of different output wavelengths; a pulse signal generating unit that generates pulse signals based on a video signal; a laser driving unit that drives the laser elements in synchronization with the pulse signals; an optical combining system that combines laser beams, outputs a combined laser beam, and retrieves part of the combined laser beam; a light amount measuring unit that measures a light amount of a retrieved laser beam; and a light amount adjusting unit that causes the laser driving unit to individually adjust a light amount for the each laser element based on a measurement value, wherein the pulse signal generating unit operates in a light amount measuring mode so that emission timings would not coincide one another, and the light amount measuring unit individually measures a light amount of the each laser element.

7 Claims, 6 Drawing Sheets

IMAGE DISPLAY DEVICE AND LASER LIGHT SOURCE DEVICE INCLUDING MULTIPLE LASER ELEMENTS WHOSE LIGHT AMOUNTS ARE INDIVIDUALLY MEASURED

BACKGROUND OF THE INVENTION

1. Field of the Invention

The present invention generally relates to an image display device and a laser light source device.

2. Description of the Related Art

Some image display devices incorporating video devices (spatial modulation elements) that do not emit light themselves, such as projection televisions and projectors, adopt a laser light source device that uses a semiconductor laser as a light source device. A laser light source device may be designed to include laser elements having different wavelengths such as red, green, and blue wavelengths.

The outputs of semiconductor lasers vary in accordance with the temperature of the laser element and ambient temperature. The outputs of the laser elements of different wavelengths have to be kept constant to stabilize the white balance and the brightness on the screen. Moreover, a laser light source device in general performs automatic power control (APC), in addition to temperature control for keeping the laser elements at a certain temperature, so that the optical output can be kept constant. The APC control here means adjustment of the amount of current that drives each laser element so as to stabilize the optical output of the semiconductor laser.

Typical APC control systems include a system of detecting a laser beam slightly emitted from the end surface opposite to the semiconductor laser beam emitting end surface, and a system of guiding part of the emission beam of the semiconductor laser into a different direction and detecting this beam (see, for example, Japanese Patent Application Laid-open No. 2004-342278). Because the detection accuracy is insufficient with the former system, the latter system is widely used.

To perform APC control in the above laser light source device that incorporates a semiconductor laser as a light source, the output value (the amount of light) has to be detected for each of the laser elements of the laser light source device. However, if, a light amount detecting circuit is arranged for each of the laser elements of different wavelengths, light amount detecting circuits, the number of each of which is the same as that of the types of wavelengths, and optical paths for the light amount detecting circuits are required. This is disadvantageous in cost and size.

Moreover, a structure may be designed to share an optical path and a light amount detecting circuit by adopting a sensor that has a wavelength resolution capacity, such as a color filter-provided sensor. However, most color filters that are commonly available at low cost cannot completely separate the amounts of beams emitted from different laser elements. With such a color filter, the output of a single laser element of a certain wavelength tends to be inaccurately detected as the outputs of plural laser elements of different wavelengths, and thus the APC control cannot be performed with high accuracy. In addition, a light amount detecting circuit incorporating a color filter that can accurately separate the amounts of beams emitted from different laser elements is impractical from the aspect of cost.

SUMMARY OF THE INVENTION

It is an object of the present invention to at least partially solve the problems in the conventional technology.

According to an aspect of the present invention, there is provided an image display device including: a laser light source device that emits laser beam; and a spatial modulation element that modulates the laser beam output from the laser light source device and thereby generates an image that is to be projected onto a screen, and the laser light source device further includes: a plurality of laser elements of different output wavelengths; a pulse signal generating unit that generates pulse signals for the respective laser elements based on a video signal; a laser driving unit that drives the laser elements in synchronization with the pulse signals; an optical combining system that combines laser beams from the laser elements and outputs a laser beam that is combined toward the spatial modulation element, and also retrieves part of the combined laser beam; a light amount measuring unit that measures a light amount of a laser beam retrieved by the optical combining system; and a light amount adjusting unit that causes the laser driving unit to individually adjust a light amount for each of the laser elements based on a measurement value of the light amount measured by the light amount measuring unit, wherein the pulse signal generating unit operates in a light amount measuring mode, in which the pulse signals for the laser elements are generated sequentially in a predetermined order, so that emission timings of the laser elements would not coincide one another, and the light amount measuring unit individually measures a light amount of each of the laser elements during an on state of each pulse signal by starting and ending measurement when the pulse signal generating unit is operating in the light amount measuring mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the image display device and the laser light source device according to the present invention are explained in detail below with reference to the accompanying drawings. The invention should not be limited by these embodiments.

<Embodiment 1>

A projection television in which a laser light source device is mounted is discussed here as an example of an image display device according to the first embodiment of the present invention, but the target of the first embodiment is not limited to a projection television. It may be equally applied to a projector, for example.

Figure 1:
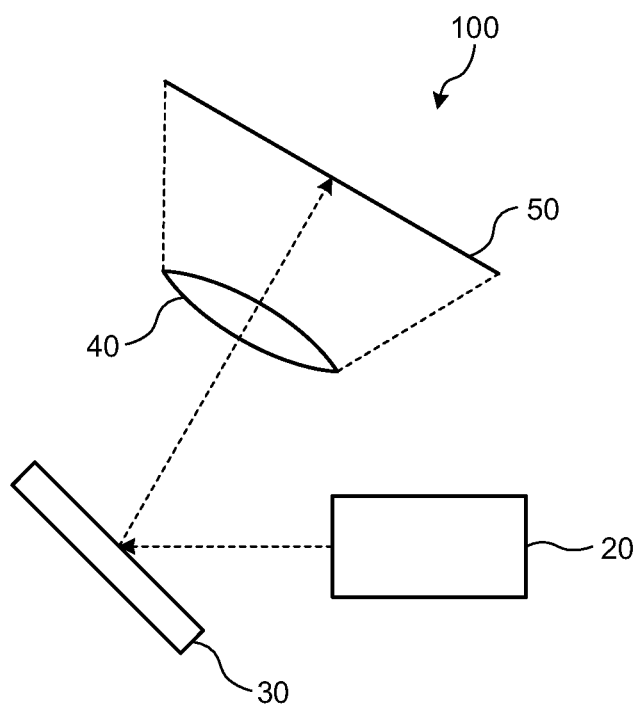
FIG. 1 is a diagram showing a structure of a projection television according to a first embodiment of the present invention.

FIG. 1 is a diagram for showing the structure of a projection television according to the first embodiment of the present invention. The projection television 100 includes a laser light source device 20, a spatial modulation element 30 that generates an image by modulating a laser beam emitted by the laser light source device 20, a lens 40 that projects an enlarged view of the image generated by the spatial modulation element 30, and a screen 50 onto which the generated image is projected by way of the lens 40. For the spatial modulation element 30, a liquid crystal micro-display or an element that realizes spatial modulation by changing the light reflection angle by use of movable minute mirrors (digital micromirror device (registered trademark) or DMD) may be adopted. Furthermore, a convex lens may be adopted in place of the lens 40.

Figure 2:
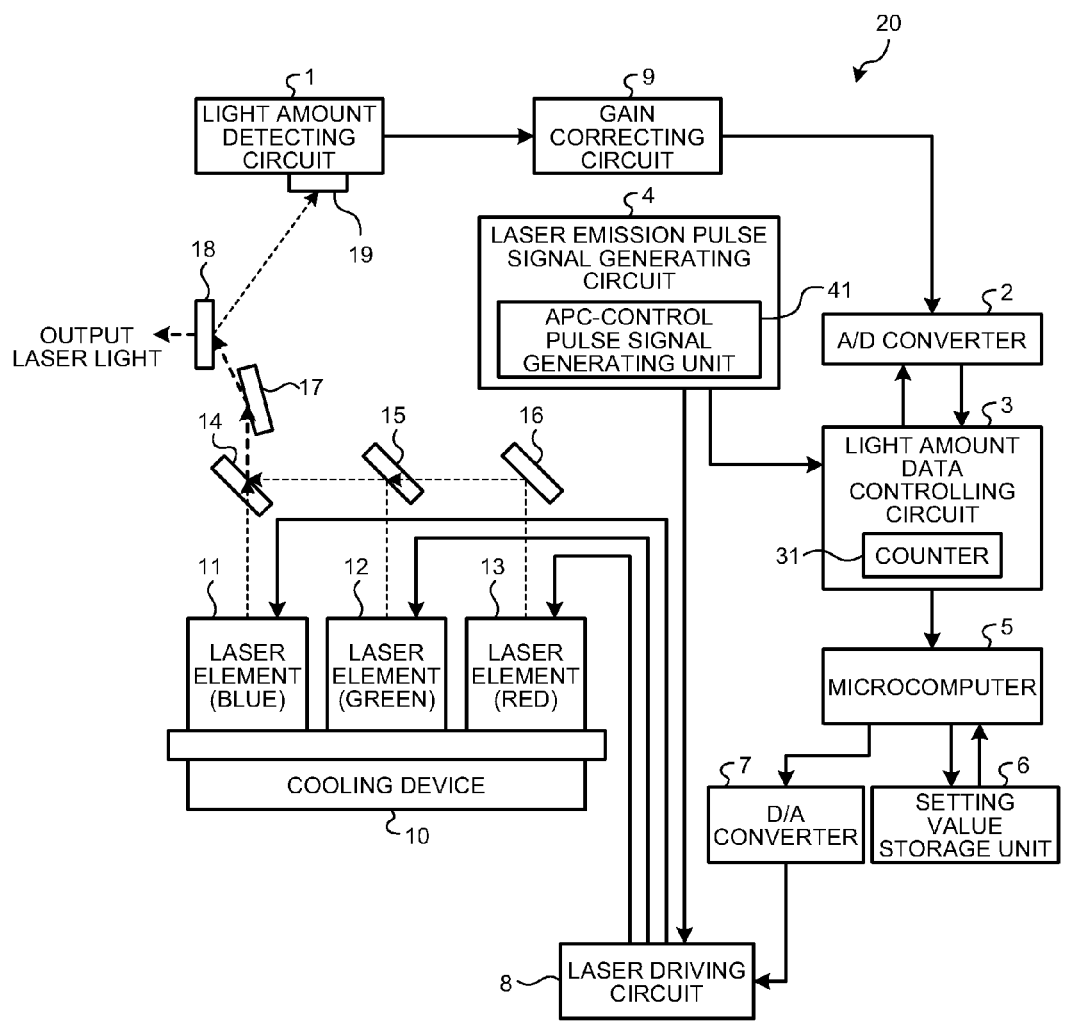
FIG. 2 is a diagram showing a structure of a laser light source device according to the first embodiment.

FIG. 2 is a diagram for showing the structure of the laser light source device 20 included in the projection television 100. The laser light source device 20 includes plural (three in this example) semiconductor laser elements 11 to 13 having different wavelengths, for example, red, green, and blue wavelengths. Here, the laser element 11 outputs a laser beam of a blue wavelength, the laser element 12 outputs a laser beam of a green wavelength, and the laser element 13 outputs a laser beam of a red wavelength. Each of the laser elements 11 to 13 may be designed to have plural laser elements having the same wavelength. The laser light source device 20 further includes a light amount detecting circuit 1, an A/D converter 2, a light amount data controlling circuit 3, a laser emission pulse signal generating circuit 4, a microcomputer 5, a setting value storage unit 6, a D/A converter 7, a laser driving circuit 8, a gain correcting circuit 9, a cooling device 10, mirrors 14 to 17, a projection lens 18, and a sensor 19.

The laser emission pulse signal generating circuit 4 issues pulse signals that individually indicate the output timings of the laser elements 11 to 13 to the laser driving circuit 8, based on a video signal. The laser driving circuit 8 supplies currents, the values of which are individually adjusted for the laser elements 11 to 13, to the respective laser elements at an issuance timing of the pulse signal, and thereby individually drives the laser elements 11 to 13. The laser elements 11 to 13 are driven by the supplied currents to individually output the laser beams. The amount of the laser beam varies in accordance with the value of the supplied current. The cooling device 10 cools the laser elements 11 to 13 so that the outputs thereof would not vary in accordance with the increased temperature of the laser elements 11 to 13.

The mirrors 14 to 17 and the projection lens 18 form an optical combining system for combining the laser beams emitted from the laser elements 11 to 13 (in other words, combining them into one optical path). The laser beams output by the laser elements 11 to 13 are combined while being reflected and transmitted several times from the mirrors 14 to 16, and the combined laser beam reaches the mirror 17. The laser beam reflected from the mirror 17 is converged by the projection lens 18, and is output of the spatial modulation element 30 as the laser beam output by the laser light source device 20. The laser beam is not entirely converged by the projection lens 18, but some of the laser beam is reflected and used as a beam for obtaining the light amount data for the APC control. In other words, the optical combining system retrieves some of the beam that is to be output to the spatial modulation element 30.

The sensor 19, the light amount detecting circuit 1, the gain correcting circuit 9, the A/D converter 2, the light amount data controlling circuit 3 function together as a light amount measuring unit that measures the amount of the laser beam retrieved by the optical combining system. Furthermore, the microcomputer 5, the D/A converter 7, and the setting value storage unit 6 function together as a light amount adjusting unit that causes the laser driving circuit 8 to adjust the amount of a beam for each of the laser elements based on the measured value of the light amount obtained by the light amount measuring unit.

More specifically, the laser beam reflected from the projection lens 18 is incident on the sensor 19 arranged to the light amount detecting circuit 1, and the light amount detecting circuit 1 converts it to an electric signal in accordance with the amount of the laser beam incident on the sensor 19. The sensor 19 does not have to be provided with a wavelength resolution capacity, and it may be a photodiode. The gain correcting circuit 9 performs gain correction onto the electric signal generated by the light amount detecting circuit 1, and outputs the gain-corrected electric signal to the A/D converter 2.

The light amount data controlling circuit 3 sends a signal to the A/D converter 2 to obtain the light amount data, and the A/D converter 2 converts the electric signal that is input thereto from the gain correcting circuit 9, to a digital value at the timing of receiving the signal from the light amount data controlling circuit 3. The electric signal digitally converted as the light amount data (measurement value) is sent to the microcomputer 5 through the light amount data controlling circuit 3.

Here, the laser beams from the laser elements 11 to 13 are combined into an optical path in the operation of the optical combining system, converted to an electric signal by the shared sensor 19 and light amount detecting circuit 1, and subjected to a signal processing by the shared gain correcting circuit 9. In other words, the optical path of the laser beam and the light amount measuring and detecting circuit are shared by the laser elements 11 to 13, which renders the structure compact. According to the first embodiment of the present invention, the laser elements 11 to 13 are designed to separately produce outputs, and the laser beams output separately from the laser elements 11 to 13 are individually measured by controlling the measurement timings such that the light amount data of the laser elements 11 to 13 are individually obtained in the structure, in which the optical path and the light amount measuring and detecting circuit are shared. To realize such a structure, the laser emission pulse signal generating circuit 4 is provided with an APC-control pulse signal generating unit 41 that outputs dedicated pulse signals (APC-control pulse signals) for causing the laser elements 11 to 13 to separately output the laser beams, and the light amount data controlling circuit 3 is provided with a counter 31 that measures time to find timings for starting and ending the light amount read operation.

The APC-control pulse signal generating unit 41 sequentially issues APC-control pulse signals for the laser elements such that the laser outputs of the laser elements would not coincide with one another. The pulse signals including the APC-control pulse signals are supplied not only to the laser driving circuit 8 but also to the light amount data controlling circuit 3. The counter 31 measures the time elapsed after the rising edge of the pulse signal for each APC-control pulse signal, and the light amount data controlling circuit 3 starts and ends the operation of reading the light amount data in accordance with the count of the counter 31, and thereby captures the light amount data of each of the laser elements 11 to 13. The APC-control pulse signals for the laser elements 11 to 13 are issued in a predetermined order, and the light amount data controlling circuit 3 identifies the laser elements corresponding to the APC-control pulse signals in accordance with the order of the pulse signals.

The microcomputer 5 compares the received light amount data for each laser element with the reference value stored in advance for each laser element in the setting value storage unit 6. The microcomputer 5 obtains a control amount for each laser element in accordance with a difference between the light amount data and the reference value such that the amount of current for the corresponding laser element is reduced if the light amount data is greater than the reference value, and the amount of current is increased if it is smaller than the reference value, and sends the obtained control amount to the D/A converter 7. The setting value storage unit 6 may be formed of a storage device such as a memory and a hard disk.

The D/A converter 7 converts the digital value of the control amount received from the microcomputer 5 to an analog value, and sends the control amount converted to the analog value to the laser driving circuit 8. The laser driving circuit 8 adjusts the individual amounts of currents that drive the laser elements 11 to 13, in accordance with the control amount of each laser element that is received from the D/A converter 7.

Figure 3:
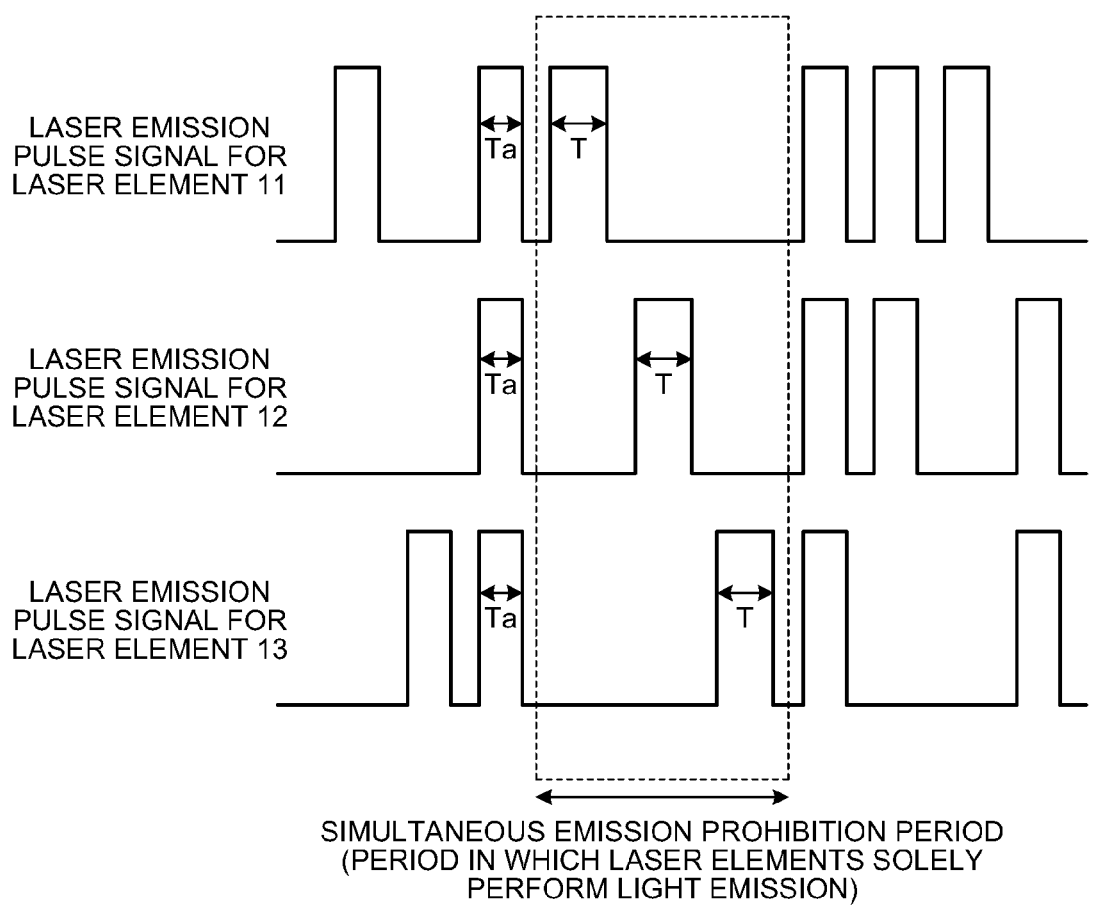
FIG. 3 is a timing chart showing timings for pulse signals issued by a laser emission pulse signal generating circuit.
Figure 4:
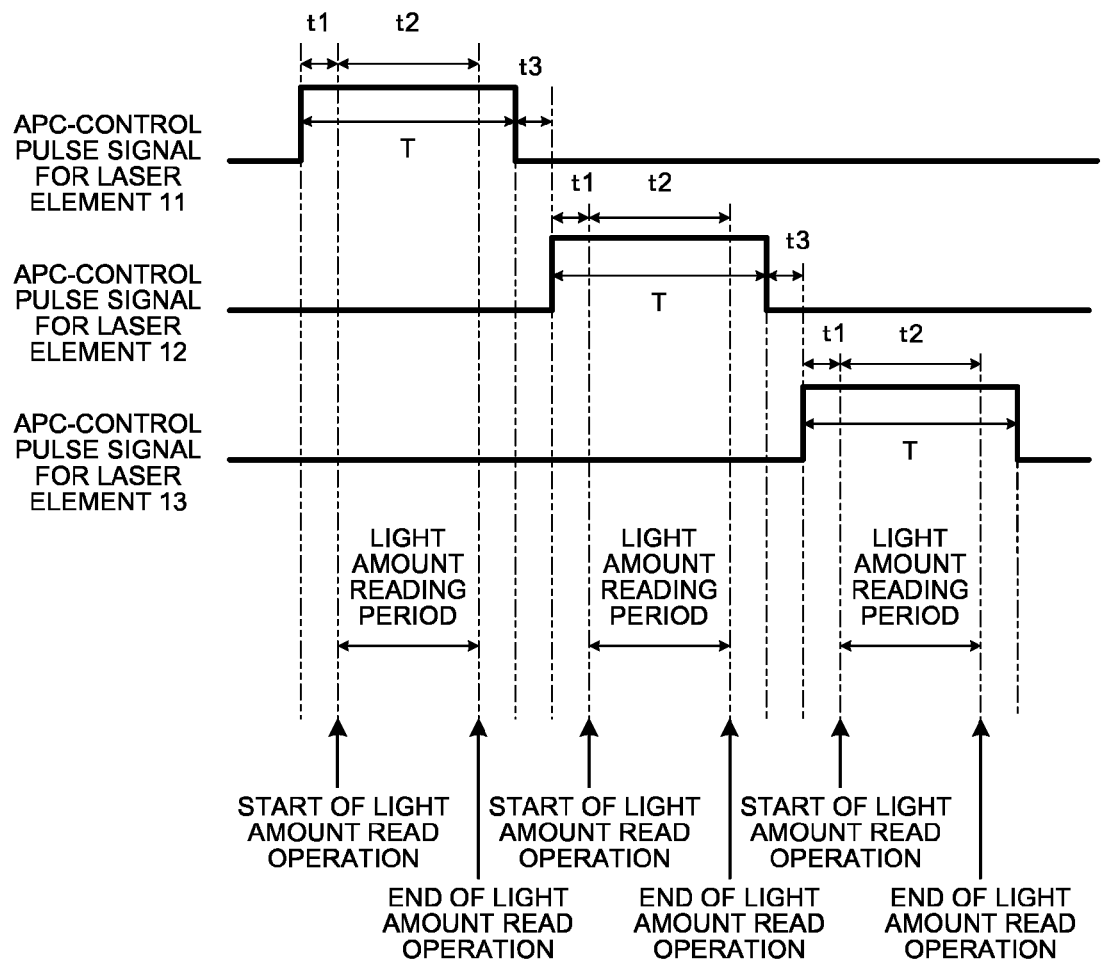
FIG. 4 is a timing chart showing timings for obtaining light amount data by a light amount data controlling circuit.

Next, the operation in which the laser light source device 20 according to the first embodiment of the present invention obtains the light amount data is explained. FIG. 3 is a timing chart for showing the timings of pulse signals issued by the laser emission pulse signal generating circuit 4, while FIG. 4 is a timing chart for showing the timings of light amount data obtained by the light amount data controlling circuit 3. In FIG. 4, t1 indicates time between a rising edge of the APC-control pulse signal and the start of light amount data read operation. t2 indicates time for the light amount data reading operation. t3 indicates an interval between the APC-control pulse signals. T indicates a pulse width of the APC-control pulse signal.

As indicated in FIG. 3, a simultaneous emission prohibition period, in which no pulse signals would be simultaneously issued to two or more of the laser elements 11 to 13, is provided during the operation of the laser light source device 20. The APC-control pulse signal generating unit 41 sequentially issues APC-control pulse signals to the laser elements 11 to 13 during the simultaneous emission prohibition period. The operation mode during the simultaneous emission prohibition period may be referred to as a light amount measuring mode. In the timing charts of FIGS. 3 and 4, APC-control pulse signals are issued to the laser element 11, the laser element 12, and the laser element 13 in this order. Simultaneous emission prohibition periods are provided at predetermined intervals, for example, vertical cycles of video signals.

The counter 31 measures the time elapsed after the rising edge of each APC-control pulse signal, and ends the measurement of the elapsed time at the falling edge of the pulse signal. Then, as illustrated in FIG. 4, the light amount data controlling circuit 3 sends a signal to the A/D converter 2 to read the light amount data when time t1 elapses after the rising edge of the pulse signal issued to the laser element 11, and thereby starts reading the light amount data of the corresponding laser element. The light amount data controlling circuit 3 terminates the read operation of the light amount data of this pulse signal when time t2 elapses after the read operation starts. It should be noted that a time point t2 is determined as (t1+t2)<T where T represents the pulse width of the APC-control pulse signal.

The pulse waveform tends to be overshot or rounded in the neighborhood of the falling edge of the pulse signal, due to delays between the structural components and the load capacity of the wirings. For this reason, T, t1, and t2 are preferably determined such that some margin presents in a value that is obtained by subtracting (t1+t2) from T so that the light amount data controlling circuit 3 would not allow the light amount data to be read in the neighborhood of the pulse signal.

After the pulse signal issued to the laser element 11 falls, the pulse signal rises for the next laser element 12. After the pulse signal for the laser element 12 rises, the light amount data controlling circuit 3 reads the light amount data at the timing similar to that of the pulse signal for the laser element 11. After the pulse signal for the laser element 13 rises, the light amount data controlling circuit 3 reads the light amount data at the timing similar to that of the pulse signal for the laser element 11. The light amount data controlling circuit 3 identifies the laser elements, which correspond to the read-out light amount data, in accordance with the order of pulse signals and sends the read-out light amount data to the microcomputer 5 as the light amount data of the identified laser element.

As described above, the laser elements 11 to 13 do not simultaneously emit beams, but they do separately during the simultaneous emission prohibition period. Thus, a relatively inexpensive sensor that is not provided with a wavelength resolving capability, such as a photo diode, can be adopted for the sensor 19.

Figure 5:
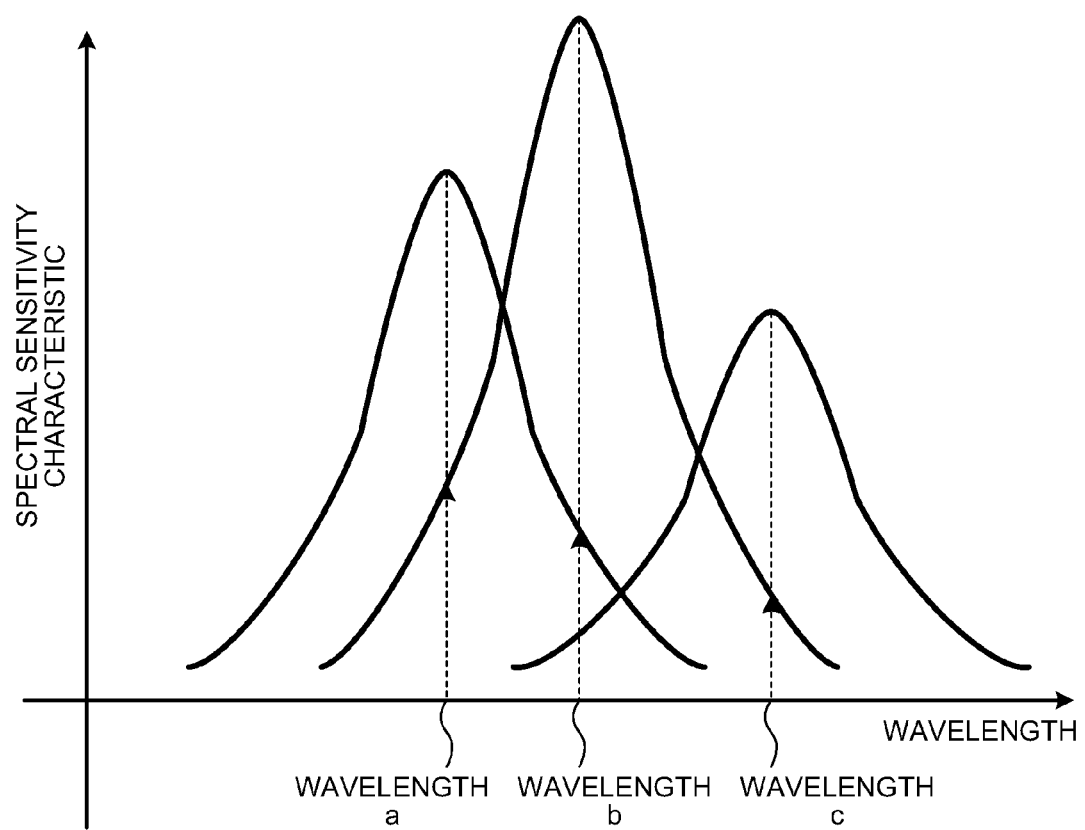
FIG. 5 is a graph showing spectral sensitivity characteristics of a generally-used color filter.

A color filter, which is a typical sensor with a wavelength resolving capability, that allows for light amount detection without setting a simultaneous emission prohibition period is considered now. FIG. 5 is a graph for showing the spectral sensitivity characteristics of a color filter that is generally used. A color filter is formed by arranging plural element filters of different colors in a matrix form. Here, the color filter includes three element filters having respective sensitivity peaks at wavelength a (blue), wavelength b (green), and wavelength c (red). For the sake of convenience, it is assumed here that wavelength a, wavelength b, and wavelength c are equal to the output wavelengths of the laser element 11, the laser element 12, and the laser element 13, respectively. As illustrated in the drawing, the sensitivity spectra of the three element filters overlap one another in their foots. For this reason, when the laser element 11 solely outputs a laser beam, not only the element filter having a sensitivity peak at wavelength a but also the element filter having a sensitivity peak at wavelength b detects the beam. In other words, when a color filter is adopted, an output from a laser element of a certain wavelength tends to be erroneously detected as plural outputs of laser elements of different wavelengths. Furthermore, laser beams of different wavelengths cannot be accurately separated. In addition, a color filter in which the spectrum foots of the element filters do not overlap one another can accurately separate laser beams of different wavelengths, and thus the light amount detection can be achieved with high accuracy at any timing. However, it would further increase the cost. In contrast, according to the first embodiment of the present invention, the outputs of the laser elements can be accurately measured with inexpensive sensor elements.

An APC-control pulse signal (i.e., a pulse signal issued during the simultaneous emission prohibition period) and a pulse signal issued based on a video signal (i.e., a pulse signal issued any time other than the simultaneous emission prohibition period) are input to the light amount data controlling circuit 3. For the light amount data controlling circuit 3 to distinguish a pulse signal of the simultaneous emission prohibition period or a pulse signal of any time other than the simultaneous emission prohibition period, Ta, t1, and T should be set to satisfy Ta<t1<T where Ta represents the pulse width of a pulse signal of any time other than the simultaneous emission prohibition period. By setting them in this manner, with respect to a pulse signal of any time other than the simultaneous emission prohibition period, the light amount data controlling circuit 3 does not read the light amount data because the pulse signal falls from the rising edge of the pulse signal before t1 elapses. On the other hand, with respect to a pulse signal of the simultaneous emission prohibition period, the light amount data controlling circuit 3 is allowed to read the light amount data because the pulse signal does not fall from the rising edge of the pulse signal even after t1 elapses. In other words, the light amount data controlling circuit 3 is configured to read the light amount data in light amount measuring mode only.

According to the first embodiment of the present invention, the laser light source device 20 includes: the laser emission pulse signal generating circuit 4 that generates pulse signals for respective of laser elements based on a video signal; the laser driving circuit 8 that drives the laser elements 11 to 13 in synchronization with the pulse signals; the optical combining system (the mirrors 14 to 17 and the projection lens 18) that outputs a laser beam to the spatial modulation element 30 after combining laser beams emitted from the laser elements 11 to 13 and also retrieves part of the combined laser beam; the light amount measuring unit (the sensor 19, the light amount detecting circuit 1, the gain correcting circuit 9, the A/D converter 2, and the light amount data controlling circuit 3) that measures the amount of the laser beam retrieved by the optical combining system; and the light amount adjusting unit (the microcomputer 5, the D/A converter 7, and the setting value storage unit 6) that causes the laser driving circuit 8 to individually adjust the light amounts of the laser elements 11 to 13 based on the light amounts measured by the light amount measuring unit. The laser emission pulse signal generating circuit 4 operates in the light amount measuring mode in which pulse signals are sequentially issued in a predetermined order so that the timings of emission from the laser elements would not coincide one another. In the light amount measuring mode of the laser emission pulse signal generating circuit 4, the light amount measuring unit measures the amount of light from each of the laser elements by starting and ending the measurement during the on state of the pulse signal. Thus, the optical path can be shared by the laser elements 11 to 13, and an element that does not have a wavelength resolving capability can be adopted for the sensor 19. Hence, an image display device and a laser light source device that are compact and can be obtained at low production cost. Furthermore, because the measuring timing of the light amount measuring unit is determined based on a pulse signal, the light amounts can be measured at the same timings as each timing with respect to the emission timings of the laser elements 11 to 13. As a result, the measurement values can be obtained with high accuracy, and the APC control can be performed with high accuracy.

Moreover, the sensor 19, the light amount detecting circuit 1, and the gain correcting circuit 9 are configured to be shared by the laser elements 11 to 13, and therefore the image display device and the laser light source device can be designed to be more compact at low cost.

As indicated in FIG. 4, time t3 between the pulse signals may be fixed. In this case, the light amount data controlling circuit 3 determines the timings of starting/ending the measurement for each pulse signal, by using as a reference the rising edge of the first pulse signal in the light amount measuring mode. More specifically, the rising edge of the first pulse signal in the light amount measuring mode triggers the counter 31 to start counting. Thereafter, the counter 31 alternately counts the pulse width T and the interval t3 between the pulses, and the light amount data controlling circuit 3 distinguishes the on/off state of each pulse signal based not on the rising/falling edges of the pulse signal but on the count.

<Embodiment 2>

If the output values of semiconductor lasers of different wavelengths largely differ from one another and the light amounts are detected by a shared sensor, light amount detecting circuit, and gain correction circuit, the light amount data values of the semiconductor lasers of different wavelengths also greatly differ from one another. This may make the control difficult. In such a situation, the light amount detecting circuit 1, the sensor 19, and the gain correcting circuit 9 may be provided individually for the laser elements of the different wavelengths.

Figure 6:
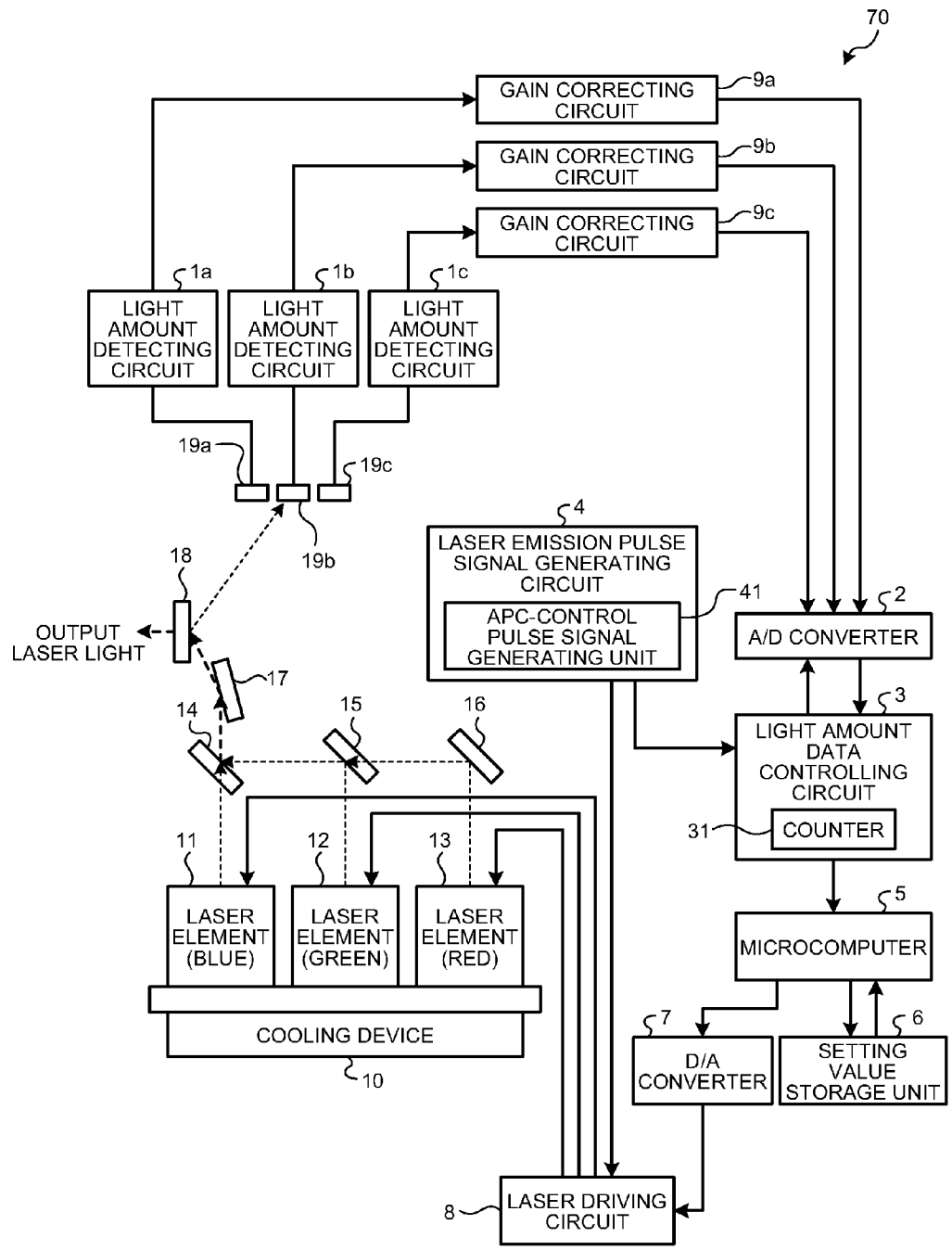
FIG. 6 is a diagram showing a structure of a laser light source device according to a second embodiment.

FIG. 6 is a diagram for showing the structure of a laser light source device according to the second embodiment including light amount detecting circuits 1, sensors 19, and gain correcting circuits 9. A laser light source device 70 includes three sensors (sensors 19a to 19c), three light amount detecting circuits (light amount detecting circuits 1a to 1c), and three gain correcting circuits (9a to 9c). The output values of the laser elements 11 to 13 are detected individually by the corresponding sensors, light amount detecting circuits, and gain correcting circuits. The three sensors 19a to 19c are arranged on the optical path in which the laser beam reflected from the projection lens 18 is incident.

According to the present invention, the optical path for light amount measurement can be shared by plural laser elements, and the measurement of the light amount of each laser element can be realized by use of a sensor that does not have a wavelength resolving capability. Hence, a compact-sized image display device can be obtained at low production cost.

What is claimed is:

1. An image display device comprising:
   a laser light source device that emits a laser beam; and
   a spatial modulation element that modulates the laser beam output from the laser light source device and thereby generates an image that is to be projected onto a screen,
   wherein the laser light source device further comprises:
      a plurality of laser elements of different output wavelengths;
      a pulse signal generating unit that generates pulse signals for the respective laser elements based on a video signal and an automatic power control (APC) scheme;
      a laser driving unit that receives the pulse signals and drives the laser elements in synchronization with the pulse signals;
      an optical combining system that combines laser beams from the laser elements and outputs a laser beam that is combined toward the spatial modulation element, and also retrieves part of the combined laser beam;
      a light amount measuring unit that receives each generated pulse signal and, on the basis of a signal width of the received pulse signal, selectively measures a light amount of a laser beam output according to the pulse signal and retrieved by the optical combining system; and
      a light amount adjusting unit that causes the laser driving unit to individually adjust a light amount for each of the laser elements based on a measurement value of the light amount selectively measured by the light amount measuring unit, wherein
   the pulse signal generating unit operates in a light amount measuring mode based on the APC scheme, in which APC-control pulse signals for the laser elements are generated sequentially in a predetermined order, so that emission timings of the laser elements would not coincide one another, and the APC-control pulse signals each would have a greater signal width than the pulse signals based on the video signal, the light amount measuring unit individually measures a light amount of each of the laser elements during an on state of each pulse signal by starting and ending measurement when the pulse signal generating unit is operating in the light amount measuring mode, and the light amount measuring unit selectively measures the light amount of the laser beam based on the signal width of each received pulse signal by delaying measurement until a predetermined period after a rising edge of the pulse singal, the predetermined peroid being longer than the signal width of each pulse signal generated based on the video signal and shorter than the signal width of each pulse signal generated based on the APC scheme.

2. The image display device according to claim 1, wherein the light amount measuring unit includes a counter that measures time elapsed from a rising edge of the each pulse signal, and starts and ends measurement at timings based on a count of the counter for the each pulse signal.

3. The image display device according to claim 1, wherein the light amount measuring unit further includes a counter that alternately performs counting of a pulse width of a pulse signal and counting of interval time between the pulse signals by using as a reference a rising edge of a first pulse signal in the light amount measuring mode, and the light amount measuring unit distinguishes on state and off state of the pulse signal based on a count of the counter, and starts and ends measurement at timings based on the count of the counter.

4. The image display device according to claim 1, wherein the light amount measuring unit comprises:

a sensor onto which the laser beam retrieved by the optical combining system is incident;

a light amount detecting circuit that generates an electrical signal in accordance with an amount of the laser beam incident onto the sensor;

a single gain correcting circuit that executes gain correction to the electrical signal that is generated;

an A/D converter that converts the electrical signal to which the gain correction is executed to a digital value and obtains a measurement value of the light amount of the laser beam; and a light amount data controlling circuit that controls a timing at which the A/D converter converts the electrical signal to the digital value in accordance with the pulse signal.

5. The image display device according to claim 1, wherein: the light amount measuring unit comprises:

sensors onto which the laser beam retrieved by the optical combining system is incident;

light amount detecting circuits that generate an electrical signal in accordance with a light amount of the laser beam incident onto the sensors;

gain correcting circuits that execute gain correction to the electrical signal that is generated;

an A/D converter that converts the electrical signal to which the gain correction is executed to a digital value and thereby obtains a measurement value of the light amount; and a light amount data controlling circuit that controls a timing at which the A/D converter converts the electrical signal to a digital value, based on the pulse signal, and the sensors, the light amount detecting circuits, and the gain correcting circuits are provided individually for the laser elements.

6. The image display device according to claim 2, wherein the counter measures the time elapsed from the rising edge of the each pulse signal and stops measuring at a falling edge of the each pulse signal; and a signal width Ta of a pulse signal based on the video signal, a signal width T of a pulse signal in the light amount measuring mode, and a count value t1 of the counter that serves as a light amount measurement start timing are determined to satisfy a relationship of:

Ta<t1 <T.

7. A laser light source device that is mounted in an image display device that includes a spatial modulation element configured to modulate a laser beam and generate an image that is to be projected on a screen, and outputs the laser beam to the spatial modulation element, the laser light source device comprising:

a plurality of laser elements having different output wavelengths;

a pulse signal generating unit that generates pulse signals individually for the respective laser elements based on a video signal and an automatic power control (APC) scheme;

a laser driving unit that receives the pulse signals and drives the laser elements in synchronization with the pulse signals;

an optical combining system that combines laser beams from the laser elements and outputs a laser beam that is combined toward the spatial modulation element, and also retrieves part of the combined laser beam;

a light amount measuring unit that receives each generated pulse signal and, on the basis of a signal width of the received pulse signal, selectively measures a light amount of the laser beam output according to the pulse signal and retrieved by the optical combining system; and a light amount adjusting unit that causes the laser driving unit to individually adjust a light amount for each of the laser elements based on a measurement value of the light amount selectively measured by the light amount measuring unit, wherein the pulse signal generating unit operates in a light amount measuring mode based on the APC scheme, in which APC-control pulse signals for the laser elements are generated sequentially in a predetermined order, so that emission timings of the laser elements would not coincide one another, and the APC-control pulse signals each would have a greater signal width than the pulse signals based on the video signal, the light amount measuring unit individually measures a light amount of each of the laser elements by starting and ending measurement during an on state of the pulse signal, when the pulse signal generating unit is of perating in the light amount measuring mode, and the light amount measuring unit selectively measures the light amount of the laser beam based on the signal width of each received pulse signal by delaying measurement until a predetermined period after a rising edge of the pulse signal, the predetermined period being longer than the signal width of each pulse signal generated based on the video signal and shorter than the signal width of each pulse signal generated based on the APC scheme.

\* \* \* \* \*